Dec. 30, 1952    P. E. FUCHS    2,623,313
EDGE ILLUMINATED SIGN
Filed June 14, 1948    5 Sheets-Sheet 1

INVENTOR.
PAUL E. FUCHS
BY
*H. A. McGrew*
ATTORNEY.

Dec. 30, 1952   P. E. FUCHS   2,623,313
EDGE ILLUMINATED SIGN
Filed June 14, 1948   5 Sheets-Sheet 2
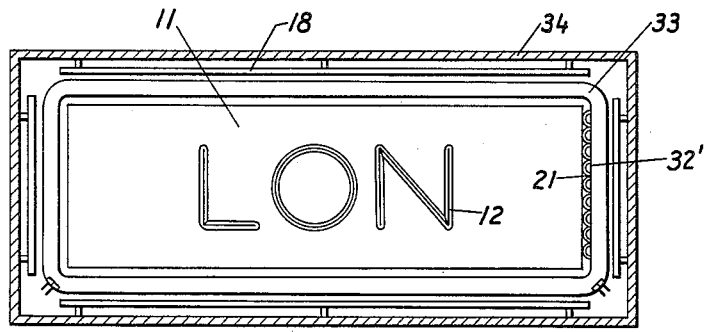
Fig. 5
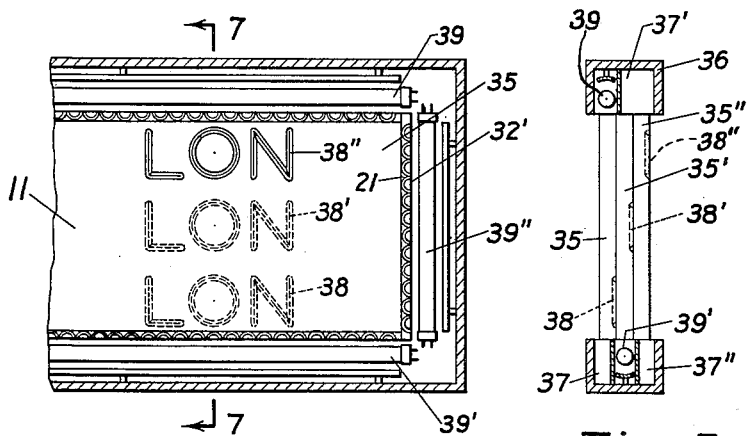
Fig. 6
Fig. 7
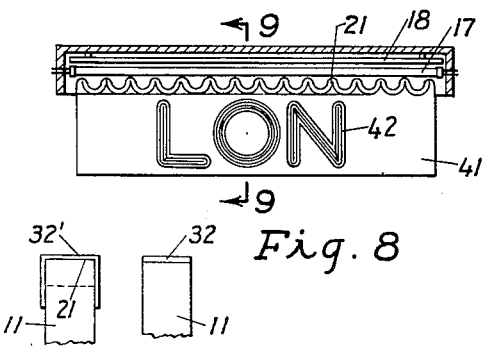
Fig. 8
Fig. 9
Fig. 10
INVENTOR.
PAUL E. FUCHS
BY
ATTORNEY.

Dec. 30, 1952 P. E. FUCHS 2,623,313
EDGE ILLUMINATED SIGN
Filed June 14, 1948 5 Sheets-Sheet 3

*INVENTOR.*
Paul E. Fuchs
BY
*M. A. McGrew*
ATTORNEY

Dec. 30, 1952 P. E. FUCHS 2,623,313
EDGE ILLUMINATED SIGN
Filed June 14, 1948 5 Sheets-Sheet 4

INVENTOR.
Paul E. Fuchs
BY
ATTORNEY

Dec. 30, 1952 P. E. FUCHS 2,623,313
EDGE ILLUMINATED SIGN
Filed June 14, 1948 5 Sheets-Sheet 5
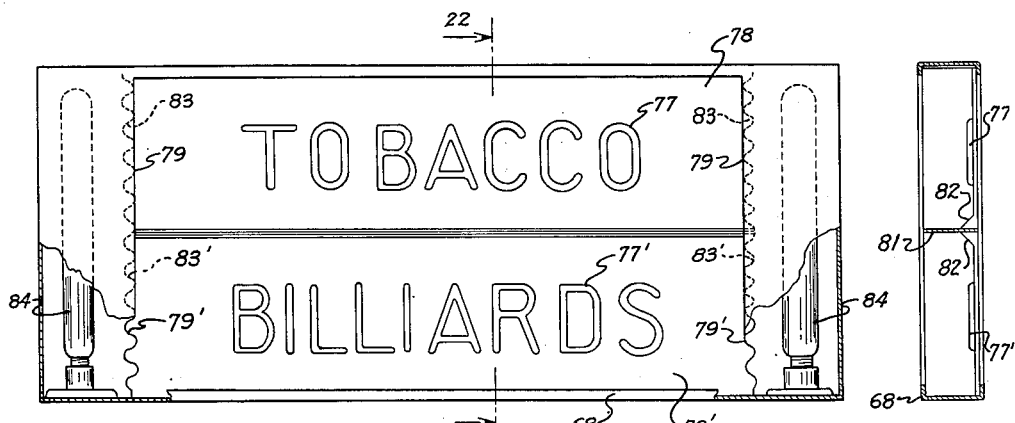
FIG.-21
FIG.-22
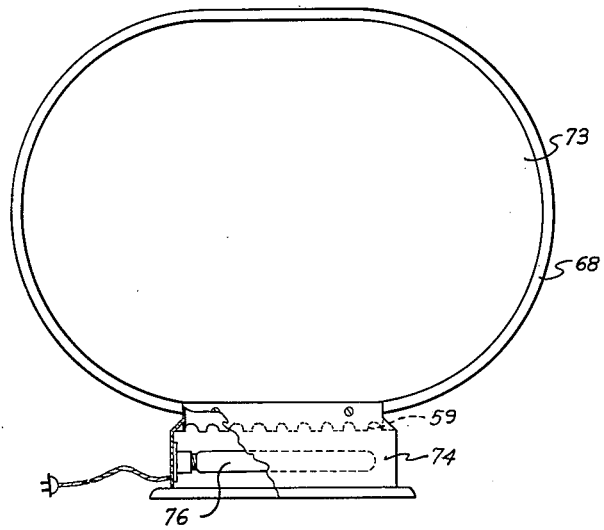
FIG.-23
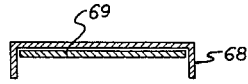
FIG.-18
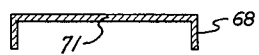
FIG.-19
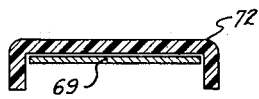
FIG.-20
*INVENTOR.*
Paul E. Fuchs
BY
*ATTORNEY*

Patented Dec. 30, 1952

2,623,313

UNITED STATES PATENT OFFICE 2,623,313

EDGE ILLUMINATED SIGN

Paul E. Fuchs, Colorado Springs, Colo.

Application June 14, 1948, Serial No. 32,909

2 Claims. (Cl. 40—130)

My invention relates to signs which may be illuminated, and more particularly to a type of sign wherein edge lighting is employed to obtain illumination of the legend.

Signs of this type are usually formed by inscribing indicia on the reverse or backside of a polished sheet formed of a plastic such as methyl acrylate, and placing a source of light near an edge of the sheet, thus illuminating the indicia. The intensity of illumination obtained by this method is not uniformly good, particularly when the distance from the most remote indicia to the light source is substantial and when the number of intervening indicia is relatively great.

It has also been difficult in signs of this type to impart pleasing or changeable color effects and to obtain, particularly in colored signs, a satisfactorily brilliant or striking advertising effect in daylight; the latter often being occasioned by the lack of contrast between the indicia and the plate in which the indicia are cut.

An important object of my invention is to overcome these and other difficulties by providing a sign of the type described in which greater intensity and uniformity of indicia illumination may be obtained from a light source of given intensity disposed near an edge of the sign, particularly in instances where the distance between the light source and the most remote indicia is relatively large, or where the number of indicia on the sign is relatively great.

Other important objects include the provision of such a sign in which the color of illumination may be varied or combined without difficulty, in which unusual and striking depth effects may be obtained and in which more striking daylight contrasts are available.

Further objects reside in the novel and useful components and arrangements thereof as will become apparent from the following descriptions and appended drawings in which:

Fig. 5 is a partially sectioned elevation of a form of my sign;

Fig. 6 is a partially sectioned partial elevation of a form of my sign;

Fig. 7 is a vertical section taken along the line 7—7 of Fig. 6;

Fig. 8 is a partially sectioned vertical elevation of a form of my sign;

Fig. 9 is a vertical section taken along the line 9—9 of Fig. 8; and

Fig. 10 is a partial diagrammatic elevation of a portion of my sign.

Figs. 18–20 are cross sectional views of suitable edge bindings for my sign;

Fig. 21 is a partially cut away elevation of a modified form of sign;

Fig. 22 is a cross section taken along the line 22—22 of Fig. 21;

Fig. 23 is a partially cut away elevation of a modified form of sign;

In brief, I have found that edge-illuminated signs may be formed to yield more uniform, brilliant indicia illumination by scalloping or otherwise convoluting the edge of the light-transmitting plate through which light enters the sign, and by providing on other edges of the plate a reflective surface. The convoluted edge tends to diffract at least a portion of the incident light rays entering the sign while the reflective edges reflect the light rays backwardly into the sign for further illumination of the indicia. Such a structure tends to reduce the intense illumination ordinarily received by the portion of the indicia lying closest to the light source and to divide the illumination more evenly between all of the indicia formed in the plate, with a resultant increase in illumination and uniformity of brilliance. Such a structure also permits a more effective use of colored light or light combinations, the use of superposed plastic plates and colored backgrounds, and improved daylight illumination, the latter being particularly notable in instances where the indicia formed in the sheet are stained with a suitable dye or provided with a suitable backing plate.

Figure 1:
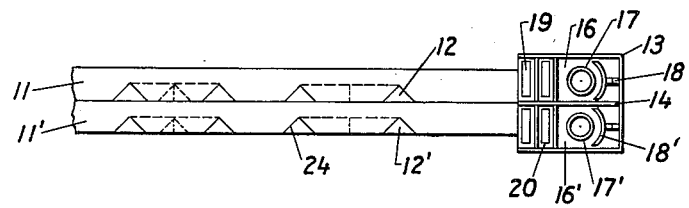
Fig. 1 is a partially sectioned plan view of a form of my sign.

In Fig. 1 I have illustrated a simple form of my sign which includes a pair of light-transmitting plastic plates 11—11', having polished faces sealed in face to face relation and provided with indicia 12—12', such as letters or numerals carved or cut in rear faces of the plates 11—11'. The plates 11—11' are supported in a generally rectangular housing 13, of sheet metal or other opaque material having a centrally disposed divider 14 mounted therein, forming enclosures 16—16', in which are mounted suitable lamps 17—17'. The housing 13 also supports a pair of curved reflectors 18—18' disposed near the lamps 17—17', and shaped to direct the light from the lamps outwardly towards the convoluted edge of the plastic sheets 11—11'. If it is desired to impart a colored effect to the sign, one or more transparent colored films 19, preferably mounted in frames 20, are removably supported by the housing 13 between the lamps 17—17' and the edges of the plated 11—11', as by flanges or the like formed in the housing 13.

Figure 4:
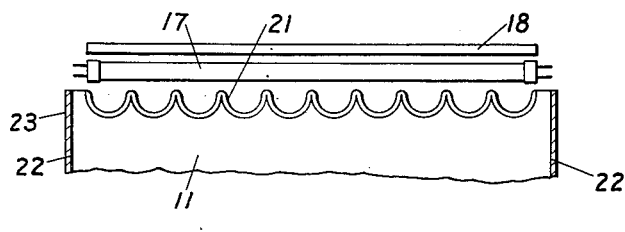
Fig. 4 is a partially sectioned diagrammatic elevation of a portion of my sign.

For my purpose it is essential that the plates 11—11' be formed of a light-transmitting material such as a polymerized methyl methacrylate resin or the like, which possesses the ability to transmit light from one edge or one end to another as well as from face to face, as distinguished from ordinary transparent materials which are capable of transmitting light only from face to face. The indicia 12 may be easily cut into such material and are illuminated by light entering from an edge of the plate, which is refracted by the walls of the cut indicia. Since the rays from the light source, such as lamp 17, travel in a straight line, it may be seen that the nearest edge of the indicia will ordinarily intercept in the majority of the light available for indicia illumination and this edge will be brilliantly illuminated; while the remainder of the indicia must depend for illumination on the light reflected or refracted to them by the portion receiving direct illumination. This heretofore has substantially prevented the attainment of uniformly brilliant illumination signs of this order and restricted the maximum size of sign. To overcome this defect I form a series of convolutions 21 along one or more of the edges of the plate 11 through which light is to be introduced. The convolutions 21 may have rough or polished surfaces normal to the faces of the plate and resemble scallops or approximately semi-circular cavities, as shown in Fig. 4, but may, if desired, also be sinusoidal or angular in form to divert at least a portion of the entering light rays from their normal course and thus obtain a dispersal effect without loss of intensity. Other and preferably adjacent edges 22 of the plate 11 are planar and normal to the face 11 and are preferably highly polished. For maximum intensity of illumination I may dispose along such edges a reflective surface, such as mirrors 23, to assist in reflection of the light rays tending to emerge from such edges, although in many instances the highly polished planar edge surfaces 22 of the plate 11 are sufficient.

Light from the lamp 17 strikes the convoluted edge 21 and enters the plate in many divergent directions, producing a scattering of the light rays, some of which strike adjacent indicia. The light rays not intercepted by indicia are reflected by the surface 22 or the mirror 23 into the plate and eventually are intercepted by the indicia, the scattering effect being so pronounced that a much more even and brilliant illumination is attained. It may be seen that substantially all of the light entering the plates, except that lost by absorption, is available for illumination, thereby providing a highly efficient structure.

The end of the plate 11 bearing the convolutions 21 is mounted within the housing 13 in relatively close proximity to the colored film or films 19, if employed. Any desired number of films 19 may be used simultaneously or in sequence, and the color imparted to my sign is easily changed by drawing the film 19 and frame 20 from the housing 13. If the sign is not to be illuminated throughout its entire period of daily use, I prefer to apply a dye or a thin transparent colored film to the walls of the indicia, as indicated at 24, to secure contrast between the indicia and the plate. During periods in which the sign is not illuminated, the indicia will therefore be clearly defined and visible to a casual observer. During periods of illumination the colored indicia surface 24 may be employed in conjunction with the colored films 19 to produce, by a combination of colors, a blended third color sometimes difficult to obtain by the use of a single film, as for example a purple resulting from the use of a red film 19 acting upon indicia having a coating 24 of blue dye applied to the indicia walls.

Figure 2:
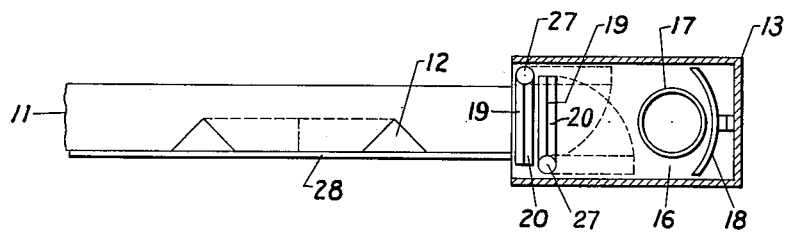
Fig. 2 is a partially sectioned plan view of a modified version of my sign.

A somewhat more convenient device for easily varying color combinations is illustrated in Fig. 2 wherein the films 19 are mounted in frames 20 pivotally secured within the housing 13 as by pins 27 parallel to the edges of the plates 11, the pins being offset to permit the simultaneous use of either or both films.

If my sign is to be viewed primarily from one side, I may in such instances seal a plate 28 to the back of a single plastic plate 11 as in Fig. 2, thus preventing an accumulation of dirt in indicia 12 and providing a reflective or semi-reflective surface immediately behind the indicia to enhance its normal contrast. Maximum reflectivity may of course be attained by employing a mirror as the plate 28, but a clear or colored plastic sheet is usable if visibility of the indicia from both sides of the plate 11 is occasionally necessary.

Figure 3:
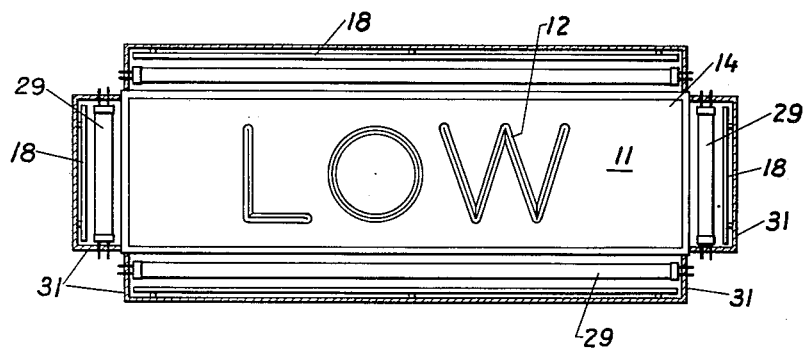
Fig. 3 is a partially sectioned elevation of a form of my sign.

In instances where a sign of substantial dimensions is required or where flashing signs having a variety of colors are necessary, a structure such as that illustrated in Fig. 3 may be adapted. In this modification indicia 12 are formed in a plate or plates 11 as in Fig. 1. Lamps 29 are mounted in suitable housings 31 which are disposed along the edges of the plates 11, the latter preferably being convoluted as previously described. The lamps 29 may be colored, each of the colors being different and connected by suitable, well-known electric devices to be illuminated simultaneously or in sequence. Colored films of a type previously described may be mounted within the housings 31 in lieu of colored lights, or a film 32 of the type shown in Fig. 10 substituted for the film 19. The film 32 may comprise a colored transparent strip of regenerated cellulose having deposited on one face thereof a transparent coating of a suitable pressure-sensitive adhesive. When applied to a flat edge of the plate 11, the film 32 may be of a width substantially equal to the thickness of the plate, but if applied to the convoluted edge 21, may be stretched along the peaks of the convolution and extended latterly for a short distance along the faces of the plate in order to attain satisfactory adhesion. Since only the edge of the plate need be colored, the section of tape adhering to the faces of the plate 11 may be transparent and only the central portion of such tape directly over the edge of the plate colored. Alternatively the transparent adhesive tape may be employed to hold a colored film in place on the edge of the plate 11. Since lights are, in this modification, mounted near each of the plate edges, the use of mirrors 23 is impractical, and the internal reflection is obtained by the use of highly polished edges, which may also be convoluted.

The modification illustrated in Fig. 5 is particularly adapted for use when it is desired to employ a single lamp 33, generally shaped to conform approximately to the outline of the plates 11. The lamp 33 will ordinarily be tubular in shape and mounted within an opaque housing 34, which also supports the plates 11 and reflectors 18. A transparent colored film 32' may be attached to convolutions 21, formed on at least one of the edges of the plates 11, to obtain suitably colored illumination.

Figure 11:
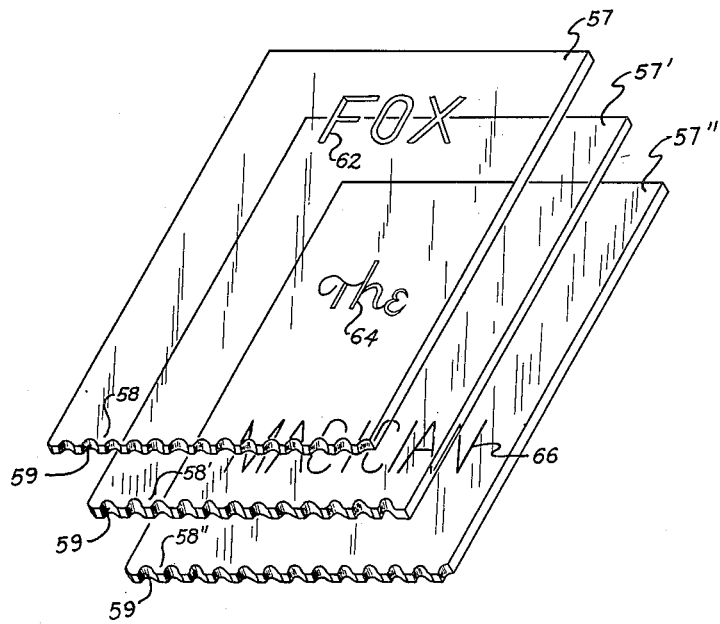
Fig. 11 is a partial perspective view of a modified form of my sign.
Figure 14:
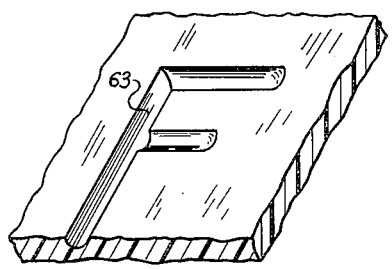
Fig. 14 is a partial perspective view of a legend inscribed on a plastic plate.
Figure 15:
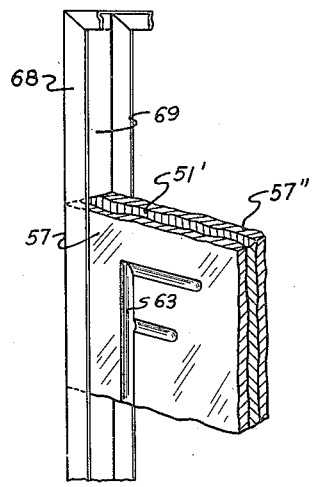
Fig. 15 is a partial perspective view of a portion of an assembled sign.
Figure 26:
Fig. 26 is a partially sectioned elevation of an assembled sign of the type shown in Fig. 11.
Figure 13:
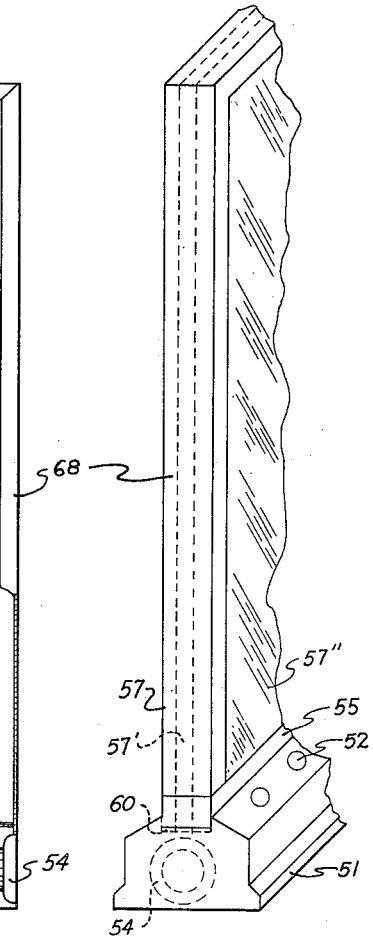
Fig. 13 is a partially sectioned perspective view of an assembled sign.
Figure 12:
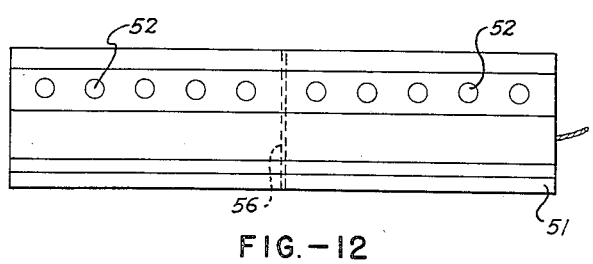
Fig. 12 is a rear view of a base for the sign illustrated in Fig. 11.
Figure 16:
Fig. 16 is a partial elevation of my sign.
Figure 17:
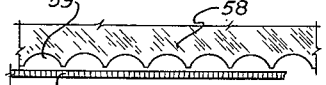
Fig. 17 is a partial elevation of a modified form of edge construction for my sign.

The effect of depth will usually be most effectively obtained, as previously described in connection with Figs. 1–5, by employing a series of light-transmitting, plastic plates in sealed face to face relation, each having cut therein indicia disposed in registry each with the other; or by the use of a reflective backing plate such as plate 28 (Fig. 2), which produces a similar result. If, however, it is desired to obtain a greater variation in color effect or legend, the indicia formed on the various sheets may be spaced out of registry each with the other for independent illumination. As shown in Figs. 6 and 7, light-transmitting, plastic plates 35, 35', and 35" preferably having convoluted edges 21 are sealed together and supported in a suitable housing 36 which is divided into compartments 37, 37', 37". Indicia 38, 38', and 38" are formed in the faces of the plates 35, 35', 35" in staggered relation so that each indicia is clearly distinct and separated from the other legends or indicia on the sign when viewed from the face thereof. Lamps 39, 39', 39" are mounted in compartments 37, 37', 37", see Figs. 6 and 7, for edge illumination of the plates 35, 35', 35". The lamps 39, 39', 39" may be illuminated in any desired sequence or simultaneously to illuminate corresponding legend or indicia carried by the plate exposed to such lamp and an unusual, although somewhat different, depth effect will be obtained from such illumination. In Figs. 11–17 and 26 I have illustrated a modified form of multiple sign wherein only a portion of the aggregate legend is formed on each superposed plate, thus making possible a more variegated and versatile color effect. As indicated in Fig. 26 I may provide a hollow metal base 51 having ventilating holes 52 formed in the rear wall for lamps 53—53' mounted in sockets 54—54' secured to the inner ends of the base 51 and separated by a centrally disposed internal partition 56. The upper surface of the base 51 defined a channel 55 of proper dimensions to receive a plurality of superposed light transmitting plastic plated 57, 57', 57". The edges of these plates are normal to the plane of the plate, the edges 58, 58', 58" disposed nearest the lamps 53—53' being convoluted as by a series of closely adjacent cut out portions 59 constituting individually slightly less than half of a right cylinder having its axis perpendicular to the plane of each plate. Strips of transparent colored film 61 may be adhered by suitable means to a convoluted edge 58 as indicated in Fig. 16, a different color being used for the edge of each of the plates 57, 57', 57", and if desired, different colors being used on each half of the edge of each plate lying on each side of the partition 56. Alternately, a strip 60 of colored transparent material may be stretched from the partition 56 to an end of the base 51 between the lamp 53 and an edge 58 of the plates. As indicated in Fig. 11, a legend 62 may be inscribed on the rear surface of sheet 57, the letter or figure being for example a series of connected grooves 63 (Fig. 14) having a depth approximately one-fourth the depth of the plate, similarly legend 64 is formed on the plates 57' and legend 66 is formed on plate 57", each of the legends being out of registry with the preceding legend and forming together the aggregate message. The assembled sheets 57, 57', 57" may be bound along the three unconvoluted edges by an aluminum or stainless steel channel 68 such as that illustrated in Fig. 18 which holds a mirror 69 against the edges of the plates, or as in Fig. 19 the central internal surface 71 of the channel 68 may be polished to a mirror finish for a similar purpose. A plastic channel 72 shown in Fig. 20 preferably colored and translucent or opaque may be substituted for the channel 68 and employed to hold a mirror surface 69 against the unconvoluted edges of the plates.

In operation, it may be assumed that the convoluted edges 58 of the plates 57, 57', 57" have each been covered with a strip 61, a different color being used on each half of each edge in such manner that the lights 53 may cast a blue light through sheet 57, while the light 53' may cast a red light through the same sheet. When the light 53 is illuminated the legends 62, 64, and 66 on the three sheets will therefore each be illuminated with a different color. This color being changed by eliminating the lamp 53' and extinguishing lamp 53 while the third color is obtained by illuminating both lamps. This illuminating arrangement is made practicable by the combined use of the convolution 59 on the edges in conjunction with a reflective strip along the remaining sides, since the light entering say the plate 57 from the lamp 53 alone is sufficient to illuminate the legend 62 with an even and intense brilliance.

It is not, of course, essential that a rectangular or square sheet be employed or that two lamps be utilized, a suitable alternative arrangement being illustrated in Fig. 23, wherein I employ an oval plate or plates 73 mounted in a suitable hollow base 74 containing a lamp 76 and having convolutions 59 formed on the portion of the edge of the plate 73 through which light from the lamp 76 enters the sign. Channel members 68 may be applied without difficulty to the oval plate 73.

A further means for obtaining unusual depth effects and also for providing a marked contrast between the indicia and the background is illustrated in Figs. 8 and 9. This modification of my sign is particularly well-adapted for use without illumination during the day, and with illumination at night. In this form I provide a plate 41 having indicia 42 inscribed in the inner or outer face. To the back of the plate 41 I seal a plate 43, which may be either a mirror or a light-transmitting, plastic plate. Colored indicia 44 in registry with but somewhat larger than indicia 42 are formed on the plate 43. When the lamp 17 is not illuminated, the indicia 44 outline the indicia 42, placing the latter in sharp contrast, not only because of the color variation, but also because of the spacing of the two complementary indicia. When illuminated, however, light enters the plate through the convoluted edge 21 and may be of a different color from that employed in forming the indicia 44, producing a further marked color contrast.

Figure 24:
Figs. 24 and 25 are partial elevations illustrating modified forms of edge convolution for my sign.
Figure 25:

As indicated in Fig. 21, a legend 77 may be formed on a light-transmitting plastic plate 78 having opposed convoluted edges 79 and disposed in edge to edge relationship with a similar plate 78' having a different legend 77' and opposed convoluted edges 79'. Between the plates 78—78' I dispose a thin reflective strip 81 and bevel the inner edge of the plates 78, 78' adjacent the strip 81 as indicated at 82. Channel 68 may be employed to hold the sign in assembled position as previously described. A transparent colored film 83 may be applied to the edges 79 while a similar film 83' of different color may be applied to the edges 79'. Lamps 84 in a suitable housing are disposed at opposite ends of the assembled sign in such manner as to direct light rays into the sign through the convoluted edges 79, 79' thus illuminating the legends 77, 77' each with a different color. The intensity of the color is increased by the use of the reflective member 81, which because of the beveled portion 82 is practically invisible. Furthermore, the color does not tend to bleed from one sign to another since the light rays can not pass through the reflective strip 81. It should not be understood from the foregoing that the convolutions formed in the edge of the light-transmitting plastic plate through which light rays enter the plate must necessarily be approximately semi-circular in form since a polygonal form of convolution 87 illustrated in Fig. 24 and approximating a semi-circle may be substituted, if desired. The convolutions may also take the form of a sign curve 88 as shown in Fig. 25, or other similar curvature. The criterion of curvature being to obtain adequate dispersal of light rays without obtaining disposition of such nature as to materially reduce the intensity of illumination.

From the foregoing it may be seen that my sign accomplishes fully the objectives of the subject invention, and is possessed of greater versatility than heretofore has been possible in signs of this type. An almost limitless range of colors or color combinations may be obtained without difficulty and at little expense, and these may be combined with unusual, striking depth effects. Furthermore, it is practical to form larger, edge-illuminated signs having more indicia inscribed thereon than has heretofore been feasible, because of the greater brilliance of indicia attained in my structure, this characteristic being attributed largely to the use of a convoluted edge and reflective edge portions on the plastic plates bearing the indicia. These effects will be noted regardless of the shape of the grooves used to form the indicia and are equally effective with a U-shaped groove, a V-shaped groove, a semi-circular groove, or a series of aligned dots.

Many further permutations and combinations of my sign elements other than those herein described will be apparent to one skilled in the art, and are to be considered as within the scope of my invention, except insofar as they may be excluded by the appended claims.

I claim:

1. An edge-illuminated sign comprising a light-transmitting plastic plate having indicia carved in a face thereof, a housing closing an edge of the plate, the portion of the edge in the housing having a series of convolutions formed therein about spaced parallel axes each being substantially normal to the faces of the plate, and means in the housing for receiving and supporting a source of light in spaced relation to the convoluted edge.

2. An edge-illuminated sign comprising a light-transmitting plastic plate having indicia carved in the face thereof, a housing closing an edge of the plate and adapted for receiving and supporting a light source in spaced relation to the edge of said plate, the portion of the edge of the plate within the housing having a series of similar semi-cylindrical convolutions formed therein, the axes of each of said convolutions being straight, parallel to the axes of the adjacent convolutions, and extending transversely across said edge in a direction substantially normal to the faces of the plate.

PAUL E. FUCHS.

REFERENCES CITED

The following references are of record in the file of this patent:

UNITED STATES PATENTS

| Number | Name | Date |
|---|---|---|
| 1,707,965 | Scantlebury | Apr. 2, 1929 |
| 1,741,748 | White | Dec. 31, 1929 |
| 1,937,957 | Hotchner | Dec. 5, 1933 |
| 1,950,548 | Fuller | Mar. 13, 1934 |
| 2,214,209 | Triplett | Sept. 10, 1940 |
| 2,354,591 | Goldsmith | July 25, 1944 |

FOREIGN PATENTS

| Number | Country | Date |
|---|---|---|
| 191,220 | Great Britain | Jan. 11, 1923 |
| 298,816 | Great Britain | Oct. 18, 1928 |
| 402,825 | Great Britain | Dec. 11, 1933 |
| 409,712 | Great Britain | May 1, 1934 |
| 523,706 | Great Britain | July 19, 1940 |
| 817,194 | France | May 24, 1937 |